(12) United States Patent
Pinkney

(10) Patent No.: US 7,925,224 B2
(45) Date of Patent: Apr. 12, 2011

(54) WIRELESS COMMUNICATION SYSTEM

(75) Inventor: John A. Pinkney, Calgary (CA)

(73) Assignee: Telecommunications Research Laboratories, Edmonton (CA)

(*) Notice: Subject to any disclaimer, the term of this patent is extended or adjusted under 35 U.S.C. 154(b) by 1179 days.

(21) Appl. No.: 11/452,124

(22) Filed: Jun. 12, 2006

(65) Prior Publication Data

US 2006/0280227 A1 Dec. 14, 2006

Related U.S. Application Data

(60) Provisional application No. 60/689,687, filed on Jun. 10, 2005.

(51) Int. Cl.
*H04B 1/40* (2006.01)

(52) U.S. Cl. .............. 455/88; 455/82; 455/73; 455/102; 455/106; 455/69; 375/130; 375/139; 375/146; 375/152; 375/219

(58) Field of Classification Search .................. 455/88, 455/73, 82, 102, 106, 69; 375/139, 130, 375/146, 152, 219, 296, 346; 370/307, 441
See application file for complete search history.

(56) References Cited

U.S. PATENT DOCUMENTS

| | | | | |
|---|---|---|---|---|
| 4,037,159 A | * | 7/1977 | Martin | 375/343 |
| 5,105,294 A | * | 4/1992 | Degura et al. | 398/199 |
| 5,204,877 A | | 4/1993 | Endo | |
| 5,592,490 A | | 1/1997 | Barratt | |
| 5,748,670 A | * | 5/1998 | Zastrow | 375/139 |
| 6,049,563 A | * | 4/2000 | Matsui | 375/139 |
| 6,130,916 A | * | 10/2000 | Thomson | 375/285 |
| 6,144,288 A | * | 11/2000 | Jahn et al. | 340/10.33 |
| 6,252,882 B1 | * | 6/2001 | Matsui | 370/441 |
| 6,396,803 B2 | | 5/2002 | Hornsby | |
| 6,453,200 B1 | | 9/2002 | Koslar | |
| 6,466,609 B2 | | 10/2002 | Koslar | |
| 6,616,254 B1 | | 9/2003 | Raphaeli | |
| 6,643,336 B1 | * | 11/2003 | Hsieh et al. | 375/343 |
| 6,697,415 B1 | * | 2/2004 | Mahany | 375/130 |
| 6,784,787 B1 | | 8/2004 | Atkins | |
| 6,784,813 B2 | | 8/2004 | Shanks | |

(Continued)

FOREIGN PATENT DOCUMENTS

AU 720596 5/1998

(Continued)

*Primary Examiner* — Marceau Milord
(74) *Attorney, Agent, or Firm* — Christensen O'Connor Johnson Kindness PLLC

(57) ABSTRACT

An apparatus to facilitate wireless communication where one side of the link is designed for ultra-low power consumption. The apparatus comprises two types of transceivers: a full function transceiver (called the "Controller") and a reduced function transceiver (called the "Terminal"), which are normally connected in a "star" network configuration (i.e. several Terminals communicating with one Controller). The Controller communicates with Terminals directly using chirp signals which contain the modulated data to be transmitted. The Terminal communicates with the Controller by re-transmitting "carrier" chirp signals which have been sent to it by the Controller. In this way the Terminal does not generate any of its own RF signals, thereby reducing its power consumption. The Terminals may not communicate directly with each other, only indirectly through the Controller.

18 Claims, 8 Drawing Sheets

U.S. PATENT DOCUMENTS

| | | |
|---|---|---|
| 6,788,204 B1 | 9/2004 | Ianelli |
| 6,791,489 B1 | 9/2004 | Richardson |
| 6,796,508 B2 | 9/2004 | Müller |
| 6,940,893 B1 * | 9/2005 | Pinkney et al. ............... 375/139 |
| 7,110,432 B2 * | 9/2006 | Hooton ........................ 375/139 |
| 7,280,607 B2 * | 10/2007 | McCorkle et al. ............ 375/295 |
| 7,283,509 B2 * | 10/2007 | Moon et al. ................... 370/342 |
| 7,403,539 B1 * | 7/2008 | Tang et al. .................... 370/445 |
| 7,486,726 B2 * | 2/2009 | Alexander et al. ............ 375/232 |
| 7,508,808 B2 * | 3/2009 | Marzetta ....................... 370/343 |
| 2003/0016760 A1 * | 1/2003 | Kruys ........................... 375/295 |
| 2007/0171960 A1 * | 7/2007 | Zhang et al. .................. 375/140 |

FOREIGN PATENT DOCUMENTS

| | | |
|---|---|---|
| WO | 2004051882 | 6/2004 |

* cited by examiner

WIRELESS COMMUNICATION SYSTEM

REFERENCE TO RELATED APPLICATIONS

This application claims the benefit under 35 USC 119 of provisional patent application No. 60/689,687 filed Jun. 10, 2005.

BACKGROUND

The many engineering challenges that face the replacement of wires used in wearable electronic devices with wireless links continue to be barriers to their deployment. First and foremost is the fact that any so-called "wearable" electronic device must be by definition lightweight and small in size. This restriction applies to the power source, meaning very little current must be used by these devices if the available power is to last more than a short period of time. The excessive power demands of existing wireless systems have thus far limited their deployment to applications with larger power sources, where the additional current drain represented by the wireless link is not significant.

There are emerging wireless systems (currently in the development stage at the writing of this patent) attempting to address this problem, however they utilize existing conventional transceiver architectures—lower average power consumption is achieved with shortened duty cycles and quiescent sleep modes. These techniques have the additional unwanted effect of reducing the average data rates for the link. What is required are novel transceiver architectures which can operate continuously using very little power.

Any such system will have to address the issue of radio channel path loss between the Controller and Terminal. Since all RF signals in the link are generated by the Controller, a double path loss (Controller to Terminal and back to Controller again) would be incurred by the signals used in the link. There are two possible solutions to this dilemma, first, the signals transmitted by the Controller may be amplified sufficiently to overcome the increased path loss. This is counter to the low-power-consumption design requirement described above for wearable systems. The second solution is to build a system which utilizes "processing gain" to facilitate reception of very low power signals [1]. All references referred to in square brackets are listed at the end of this patent disclosure and incorporated herein by reference.

Processing gain may be provided by Direct Sequence Spread Spectrum" (DSSS) techniques, which utilize digital pseudo-noise sequences with a bandwidth many times that of the data signal [2]. Such systems are sub-optimal for low power operation, however, due to the complexity of signal acquisition, and synchronization schemes which must be implemented in the receiver. DSSS systems have substantial quiescent power drain, even when no data is being sent.

Processing gain may also be provided by using chirps rather than digital pseudo-noise sequences, and is sometimes called "Chirp Spread Spectrum" or (CSS) [3]. This modulation method has the advantage of requiring, no synchronization and thus requires little or no quiescent power drain. CSS can also be implemented completely in analog hardware (i.e. with no DSP), thus negating the tradeoff between bandwidth and power consumption inherent in digital systems. Very large processing gains (>10,000) are practical in CSS systems, since there is no synchronization load. Signals may also overlap in time to further increase the data rate [3].

Chirps signals have been used in a variety of systems including RADAR systems [4], two way wireless communication systems [5-8] and U.S. Pat. Nos. 6,466,609; 6,453,200; 6,940,893; 6,788,204; 6,144,288, and also in Australian patent no. 720,596.

There are known wireless communication systems which allow for asymmetry in the link transceivers, as for example in RF ID tag technology. In these systems (examples are U.S. Pat. Nos. 6,796,508, 6,791,489, 6,784,813 and 6,784,787—there, are many more) the limited function side of the link is usually reduced to complete passivity (i.e. unpowered), relying on excitation from the full-function side to initiate operation.

There remains an engineering challenge to provide full two way communication over short distances with low power consumption.

SUMMARY

In a method of wireless communication between transceivers in which the transceivers include at least a controller and a terminal, the controller transmits signals to the terminal according to a protocol and the terminal processes the signals in a retransmit mode and a data processing mode. In the re-transmit mode, the terminal modulates and re-transmits signals received from the controller. In the data processing mode, the terminal demodulates signals received from the controller. By this method, power is not needed for transmission of signals from terminal to controller, rendering the terminal less complex.

A wireless transceiver is also provided for use in a wireless communication system. The wireless transceiver incorporates an antenna, a re-transmitter and a data processor. The re-transmitter is operably connected to the antenna and incorporates a modulator. The data processor including a data sink and a data source. The data sink is connected to receive signals from the antenna and the data source is connected to the modulator to provide modulation of data onto re-transmitted signals.

BRIEF DESCRIPTION OF THE DRAWINGS

There will now be described preferred embodiments of a wireless communication system with reference to the drawings, by way of example, in which like reference characters denote like elements, and in which.

DETAILED DESCRIPTION

Figure 1:
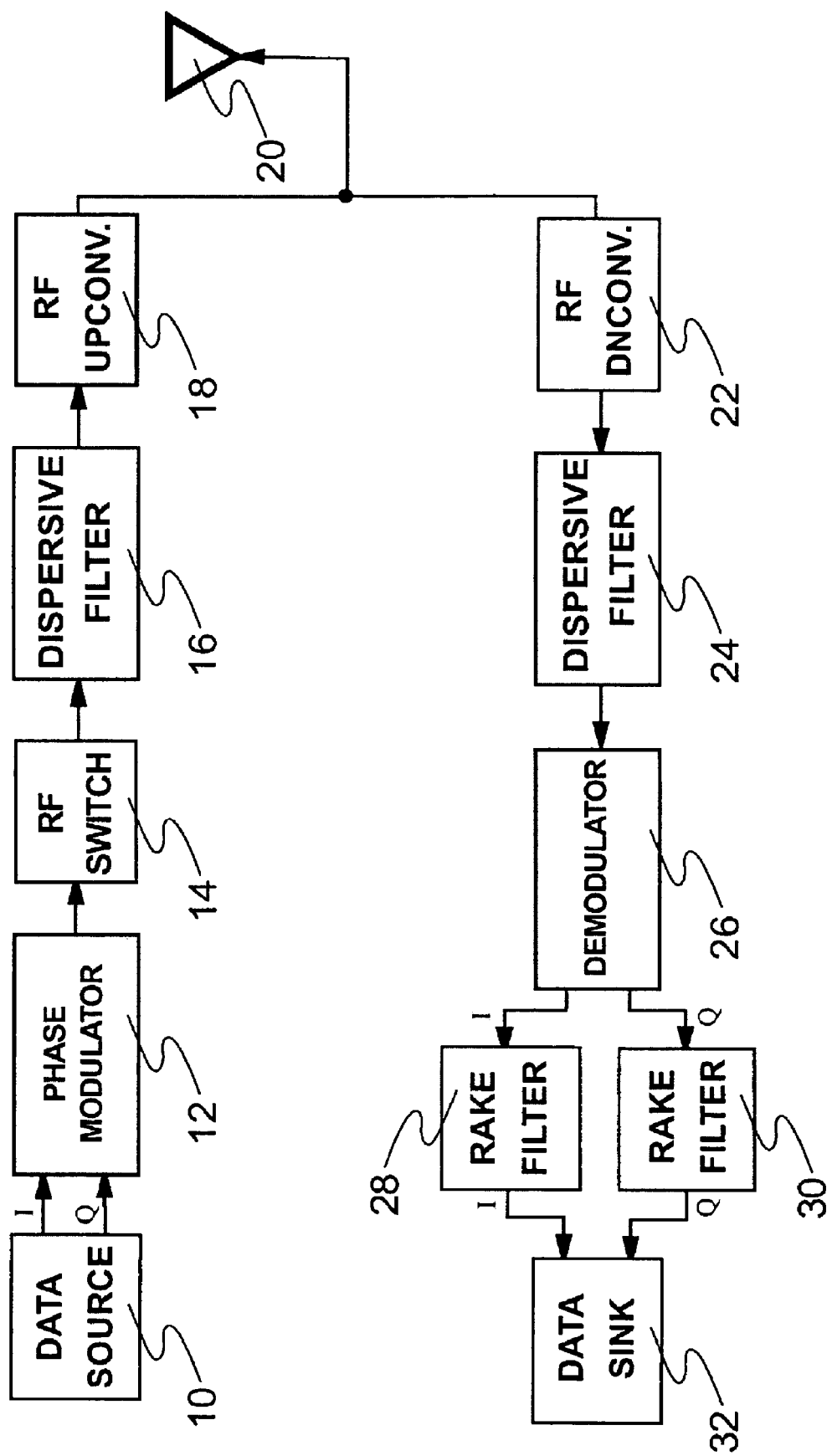
FIG. 1 shows a block diagram of a Controller portion according to a first embodiment of a wireless communication system, where the Controller has been implemented using Direct Modulation-type architecture.

The wireless communication system described here provides two-way short-range wireless data communication where one side of the link operates from very limited power source, for example a watch battery. The low power source is used to provide power to a data processing section. The wireless communication system may be operated continuously to achieve medium data rates, or in a reduced duty cycle mode (with a corresponding reduction in data rate) to minimize the average power consumption. The wireless communication systems is controlled according to a method of exchange of signals within the link (signalling protocol).

It is desirable to remove hardware complexity from one side of the link, thus creating an asymmetry in functionality between the two sides of the link. The wireless communication system thus has two different types of transceivers: a reduced function transceiver (which is called the "Terminal") that does not generate any of its own RF signals, and a full function transceiver (called the "Controller") which is responsible for the generation of all RF signals used in the link. It is the elimination of the RF signal generating hardware from the Terminal which allows its power requirements to be significantly reduced.

The two types of transceivers, Controller and Terminal, typically exist in a network which is organized in a "star-type" topology, that is, Controllers communicate with Terminals and other Controllers, whereas Terminals communicate only with Controllers (Terminals do not communicate directly with other Terminals). The Controllers may be conventional Chirp Spread Spectrum transceivers that have been modified to transmit two types of signals: those with data modulated on them (conventional Chirp Spread Spectrum modulated signals) and those with no information modulated on them (i.e. chirp "carrier" signals).

If Controller-to-Terminal communication is to be initiated, the Controller will transmit a series of chirp spread spectrum signals (which may or may not be overlapping) modulated with data using a chirp spread spectrum modulation scheme that is compatible with the Terminal's demodulator. The modulation technique may use chirps with different sweep rates or directions or it may use chirps with differential phase information to carry the data, or some other modulation technique now known or hereafter developed.

When a Terminal wishes to initiate a data transfer between it and the Controller, the Controller must first transmit a "carrier" chirp signal at a prescribed time between it and the Terminal. This "carrier" chirp signal is a chirp signal of known bandwidth and sweep rate with no modulation information imparted upon it. The "carrier" chirp signal will be received by the Terminal, downconverted if necessary, and amplified. The Terminal then uses this signal to impart its own modulation information (using a modulation technique known to both it and the Controller), delays it a prescribed amount of time, then upconverts it (if necessary), amplifies it, and retransmits it back to the Controller.

During the time period when the Terminal is processing the signal, the Controller is quiescent, listening to the channel in anticipation of the Terminal's retransmitted signal. When this signal is detected, the Controller will extract the modulated data from the retransmitted signal, and prepare to transmit the next "carrier" chirp signal for the Terminal to process. This exchange of signals will continue until a prescribed number of signals have been transferred from the Terminal to the Controller. In this way the Terminal is able to communicate with the Controller without generating its own carrier signal.

Since Controller-to-Terminal data transmission allows for symbol overlap while Terminal-to-Controller transmission does not, the maximum data transfer rate will generally be greater in the Controller-to-Terminal link than in the Terminal-to-Controller link. Also it can be seen why direct Terminal-to-Terminal communication is not possible, since in such a case neither side of the link will have the ability to generate the required "carrier" chirp signal. Indirect Terminal-to-Terminal communication is possible provided a Controller is used as an intermediary.

In addition, since both the Terminal and Controller receive and transmit on the same frequency band (the exchange of signals is a form of time domain duplexing), the delay imparted on the "carrier" chirp signal by the Terminal before retransmission must be the same or greater than the total duration of the "carrier" chirp signal.

When a Controller wishes to communicate with another Controller, a simple duplex link may be established, and communication carried out as between two conventional Chirp Spread Spectrum transceivers [9]. Signal overlap would also be permitted in such a link, thus providing for high data rate transfers between Controllers.

Figure 2:
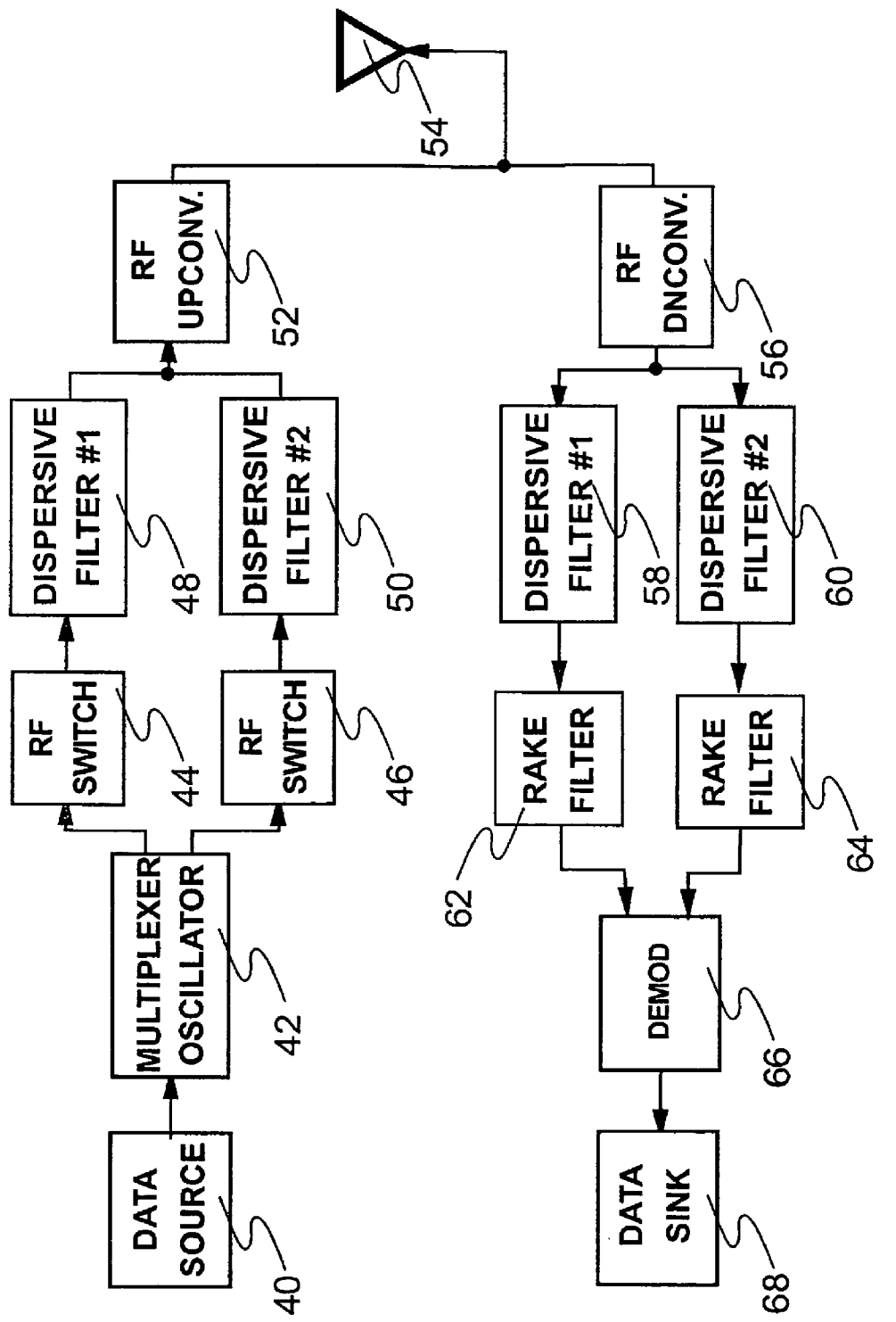
FIG. 2 shows a block diagram of a Controller portion according to a second embodiment of a wireless communication system where the Controller has been implemented using Binary Orthogonal Keying-type architecture.
Figure 3:
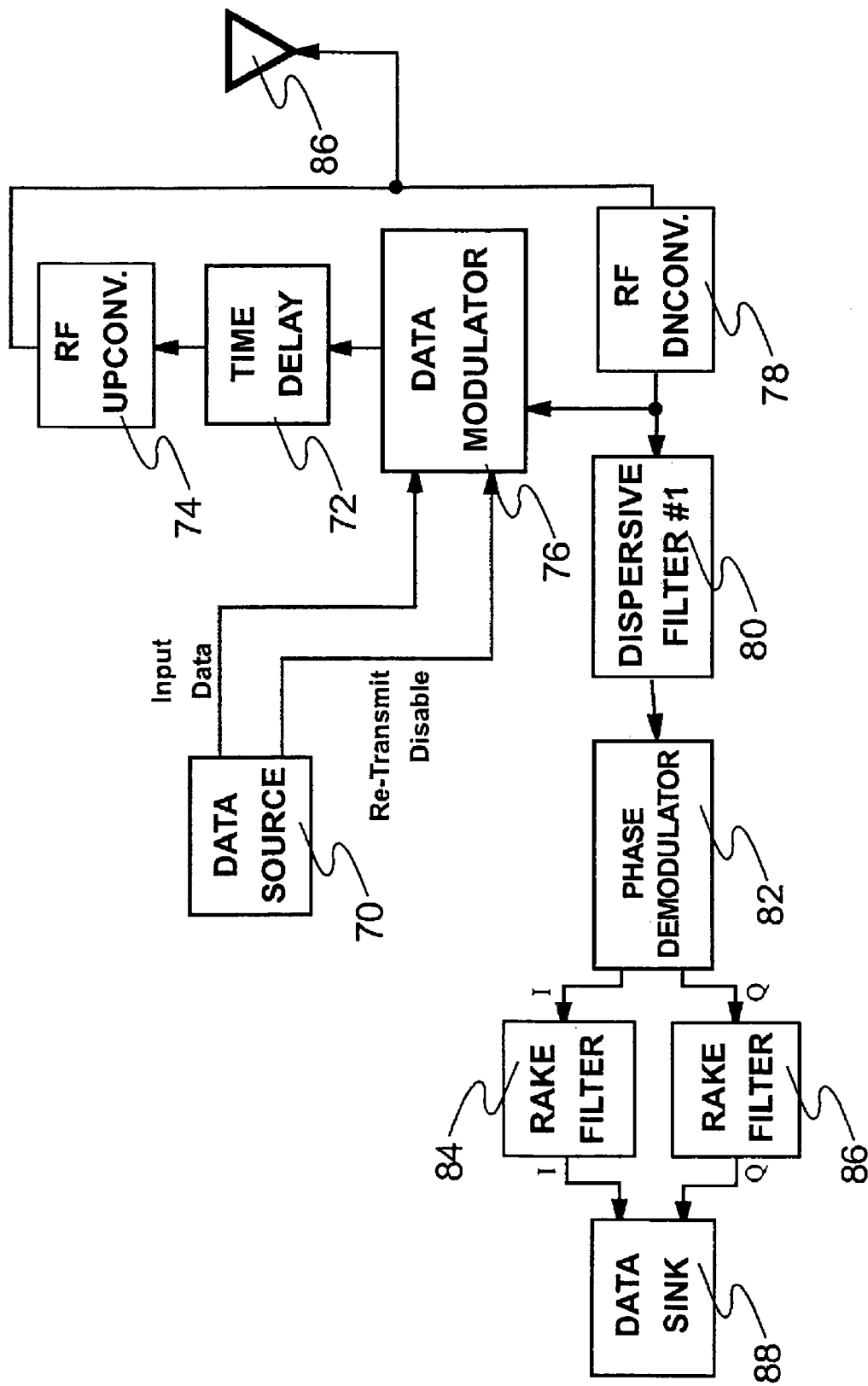
FIG. 3 shows a block diagram of a Terminal part of an embodiment of a wireless communication system where the Terminal has been implemented using a Direct Modulation-type architecture.
Figure 4:
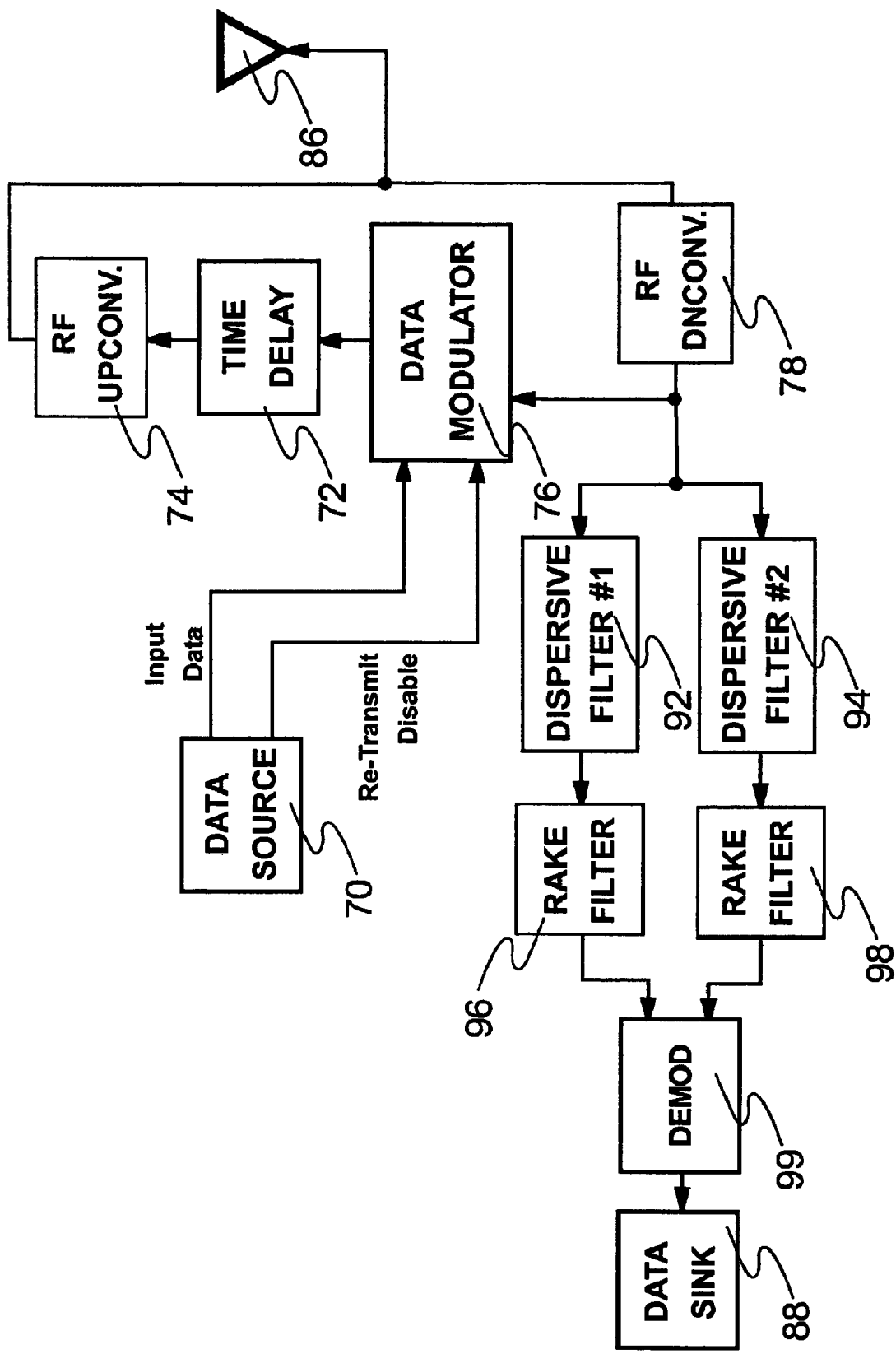
FIG. 4 shows a block diagram of a Terminal part of an embodiment of a wireless communication system where the Terminal has been implemented using a Binary Orthogonal Keying-type architecture.

The basic apparatus which performs the operations described above comprises a full function device called the Controller (FIG. 1 and FIG. 2) and one or a plurality of reduced function devices called Terminals (FIG. 3 and FIG. 4). The Controller communicates with the Terminal (or Terminals) through a wireless link forming a data network which allows duplex communication between the Controller and the Terminal(s) without interference. There are also provisions in the Controller's configuration to allow communications between different Controllers, thus provisioning the possibility of inter-network communications. This description details the hardware configurations of various embodiments of both the Controller and the Terminal parts of the device, as well as the method of communication and multiple access which would be used to create the network.

A schematic diagram of the Controller device is shown in FIG. 1. This embodiment of the Controller utilizes direct modulation chirp spread spectrum as its modulation and signaling method. Direct modulation chirp spread spectrum is in itself a known modulation technique [9]. Information in the form of binary data is accepted from the data source 10, which can be either in scalar (i.e. single output) form, or in vector (dual output, that is in-phase and quadrature, as shown in the Figure) form. This data is accepted by a phase modulator 12, which differentially encodes the value of each data symbol onto a carrier's phase. This technique is known as Differential Phase Shift Keying (DPSK), (or in the case of the vector form binary signal, DQPSK). Such an encoding technique is in itself known in the art [11]. The differentially phase modulated carrier is then passed to an RF switch 14, which converts the continuous RF modulated carrier signal into short duty cycle RF pulses which are synchronized with the data stream, that is, with one pulse per modulated data symbol. The pulsed and modulated RF carrier is then passed through a phase dispersive (chirp) filter 16 which spreads the frequency components of the pulses modulated RF carrier out in time, producing a chirp signal. This filter can be a linear chirp filter or a nonlinear chirp filter, as for example described in [12]. The differentially-modulated chirp signals are then passed through an RF upconvertor 18, which changes the centre frequency of the chirp signal from that of the dispersive filter 16, to whatever frequency is desired for transmission. It should be noted that if the dispersive filter operates at the same centre frequency as is desired for transmission, this stage is not needed. This signal is then fed to the Controller antenna 20, for transmission over the wireless channel.

Also a part of the Controller device is a receive path capable of reception of signals transmitted by Terminals as well as other Controllers. This path is also shown in FIG. 1, and begins with the Controller antenna 20, which receives signals transmitted over the wireless channel. The controller antenna feeds the received signal into the RF downconvertor 22, which converts the centre frequency of the received signal from the transmitted centre frequency to a centre frequency compatible with the receive path dispersive filter 24. if the dispersive filter uses the same centre frequency as the frequency of transmission, this stage is not needed. This filter may be a linear chirp filter or a nonlinear chirp filter whose properties are matched to the transmit path dispersive filter 16 such that the phase dispersion produced by the transmit path dispersive filter is cancelled out, as in conventional Chirp Pulse Compression [4]. The output of the dispersive filter is passed to a demodulator 26, which is capable of demodulating signals produced by both Terminals and other Controllers. The output of the demodulator passes to a RAKE filter 30,28 which combines the multpath signals produced by the channel to provide a form of diversity. The demodulator output can be either scalar (single output) or vector (inphase and quadrature outputs). The output of the RAKE filter is fed into the data sink 32, which is the system capable of utilizing the demodulated data bits. The data sink 32 may be entirely onboard the Terminal or may be at least in part an external device.

FIG. 2 shows a second embodiment of The Controller, one which uses BOK-type chirp spread spectrum signaling. BOK Chirp Spread Spectrum is itself a known modulation technique [10]. As in FIG. 1, data bits are produced by the data source 40, in either scalar (single output) or vector form (inphase and quadrature) and fed into a multiplexer/oscillator 42, which transfers an RF carrier signal into one of two possible outputs, depending on the value of the data from the data source. Each of these two paths are identical, consisting of an RF switch 44,46 and a dispersive filter 48, 50. These pairs of elements convert the RF carrier into short pulses synchronized with the data source, and spread the RF pulses out in time, similar in function to the RF switch 14, and dispersive filter 16 of FIG. 1. The output of both dispersive filters is then summed and fed into an RF upconvertor 52, which translates the centre frequency of the signal from that of the dispersive filter to the transmit frequency (again, this block may or may not be needed, depending on the centre frequency of the dispersive filter). The upconverted signal is then fed to the Controller antenna 54, for transmission over the wireless channel. The Controller may use various modulation methods such as time-frequency characteristics of the chirp signal (i.e the sweep polarity), phase of a chirp signal and frequency shift of a chirp signal.

The receive path of the BOK-type chirp spread spectrum controller is also shown in FIG. 2. The signal received by the Controller antenna 54, is passed to the RF downconvertor 56 (again, an optional component), which translates the received signal's centre frequency to the centre frequency of the dispersive filter 58,60. Each of the dispersive filters is matched to the signals produced by the transmit path dispersive filters 48,50. Thus dispersive filter 58 would be matched to the signal produced by dispersive filter 48, for example, and dispersive filter 60 would be matched to the signal produced by dispersive filter 50. By matched it is meant that one filter provides signal compression by removing the time dispersion created by the other filter as for example in conventional manner [11]. The two outputs of the dispersive filters are each fed into RAKE filters 64,62 from there into the Controller demodulator 6. The Controller demodulator is also able to demodulate data signals sent to it by the Terminal. The RAKE filters combine the mutipath signals produced by the channel to provide a form of diversity. The output of the demodulator is fed into the data sink 68, which is able to utilize the data signals produced by the Controller receive path.

The block diagram for the Terminal device which uses direct modulation chirp spread spectrum is shown in FIG. 3. This embodiment of the Terminal device would be utilized in conjunction with the Controller device shown in FIG. 1. In this device, the Terminal antenna 86, receives the signal sent by the Controller, and feeds it to the RF downconvertor 78, which translates the centre frequency of the signal from its transmit frequency over the wireless channel to a frequency which is compatible with the Terminal circuitry. Note that it is feasible to have the Terminal circuitry operate at a centre frequency which is identical to the transmit frequency, in which case the RF downconvertor stage is not needed. The RF downconvertor feeds into the Terminal dispersive filter 80, and the Terminal data modulator 76. The Terminal dispersive filter performs a similar function to the Controller dispersive filter 24, in that the phase dispersion produced by the Controller transmit path dispersive filter 16, is perfectly matched. The output of the Terminal dispersive filter is then passed to the Terminal phase demodulator 82, which may be a SAW filter, and to the RAKE filters 84, 86, which may include or be followed by level detectors. As with the Controller, the output of the demodulator can be scalar (single output) or vector form (dual output). The outputs of the RAKE filters are the received data bits, which are fed into a data sink 88, for utilization. The above described signal path is utilized for Controller-to-Terminal data transmission.

The second path from the Terminal RF downconvertor 78, feeds into the terminal data modulator 76. The terminal data modulator imparts modulation information onto the "carrier" chirp signals received by the Terminal for retransmission. This information may be in the form of phase shifts, differential phase shifts, amplitude keying, or some other method. Various embodiments of the Terminal data modulator are covered in detail in FIGS. 5, 6, and 7. The data which is to be modulated using the terminal data modulator is provided from the Terminal data source 70, which also provides a signal used to disable the data modulator, thus allowing re-transmission to be disabled, as when, for instance, the Controller is transmitting data to the Terminal. This signal is labeled "Re-transmit Disable" in FIG. 3. The output of the Terminal data modulator then passes to a time delay element 72, which delays the signal sufficiently to ensure when it is re-transmitted, no other signals are being received. The output of the time delay element passes through an RF upconvertor (again, provided the Terminal's operational centre frequency is different from the frequency of transmission), and to the Terminal antenna, 86.

The block diagram of a Terminal device which uses BOK-type chirp spread spectrum (and is designed to be used in conjunction with the Controller of FIG. 2) is shown in FIG. 4. As with the Terminal described in FIG. 3, this embodiment of the Terminal receives the signals transmitted by the Controller via the Terminal antenna 86, which are passed to the RF downconvertor, 78. As before, the RF downconvertor may be eliminated depending on the transmit frequency and the frequency of operation of the Terminal dispersive filters. The signal from the RF downconvertor is passed both to the Terminal data modulator 76, and a pair of dispersive filters 92, 94, which are matched to the signals produced by the Controller dispersive filters 48, 50. The outputs of the Terminal dispersive filters are passed through rake filters 96, 98, which combine the multipath produced by the channel to provide a form of diversity. The output of both of the rake filters are passed to a data demodulator 99, which uses the strength of the signals at each of the rake filter outputs to determine whether a 1 or 0 was transmitted. The data produced by the demodulator is fed into a data sink 88, which utilizes the data.

The second path which the signal takes from the RF downconvertor (that is, through the data modulator 76, time delay 72 and RF upconvertor 74, is identical in function to these blocks in FIG. 3, and the reader is instructed to read the above description for the function of these elements. The second path of FIGS. 3 and 4 including antenna 86 forms a re-transmit section or re-transmitter, while the data source 70, dispersive filter 80, demodulator 82, filters 84 and 86 and data sink 88 together form a data processor of FIG. 3 and the data source 70, dispersive filters 92, 94, rake filters 96, 98, demodulator 99 and data sink 88 together form a data processor of FIG. 4. The data processor may be provided with its own power source, for example a watch battery.

Figure 5:
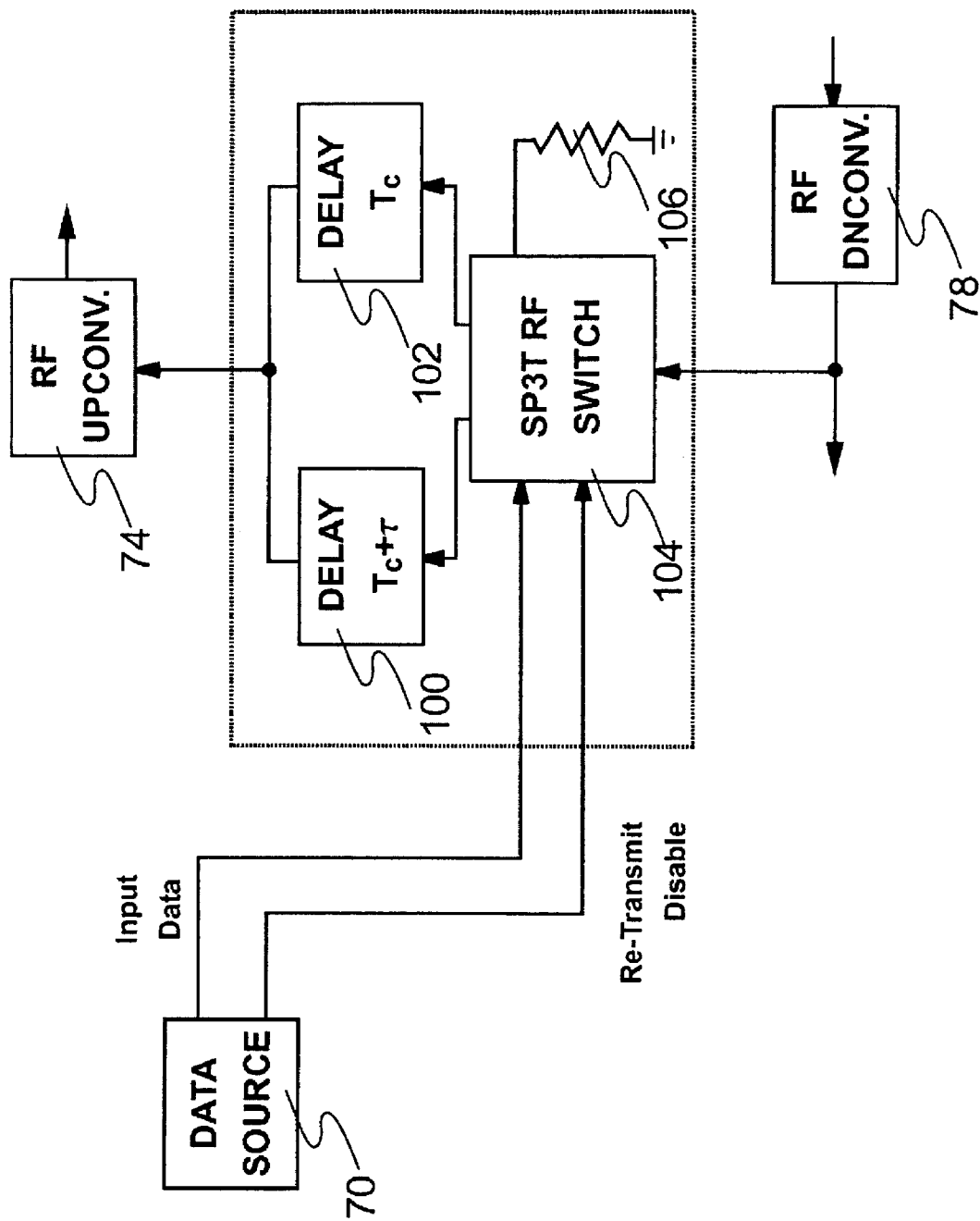
FIG. 5 is a detailed block diagram of a data modulator section of FIGS. 3 and 4, showing a Pulse Position Modulation-type embodiment of a data modulator.

FIG. 5 is a exploded block diagram of the data modulator blocks (76) in FIG. 3 and FIG. 4. In embodiment shown in this figure, the Terminal uses Pulse Position Modulation (PPM) as the method of imparting its data on the Controller's carrier signal. The received, downconverted signal is fed from the RF downconvertor 78, to the Terminal data modulator, 76. The first part of the Terminal data modulator is a single-poll three position RF switch 104, which allows the signal from the RF downconvertor to be passed to one of two outputs, or shunted to ground, under control of the data source, 70. The outputs of the data source, 70, are the data to be modulated (the input data line in FIG. 5), and a re-transmit disable line, which prohibits the received signal from passing through the data modulator. When the re-transmit disable line is active, the output of the RF switch 104 is shunted to ground through a load, 106. When the re-transmit disable line is inactive, the signal from the RF downconvertor is passed to one of two delay circuits, 100, 102, according to the state of the input data line. One of the delay circuits, 102, has a delay equal to the transmitted chirp duration, $T_C$, and the other, 100, has a delay which is slightly longer than this, denoted by $T_C+t$. In this way, the delay imparted on the received signal will one of two values determined by the state of the input data line. The output of the two delay circuits 100 102, is then summed together and passed to the RF upconvertor 74, for retransmission over the channel.

Figure 6:
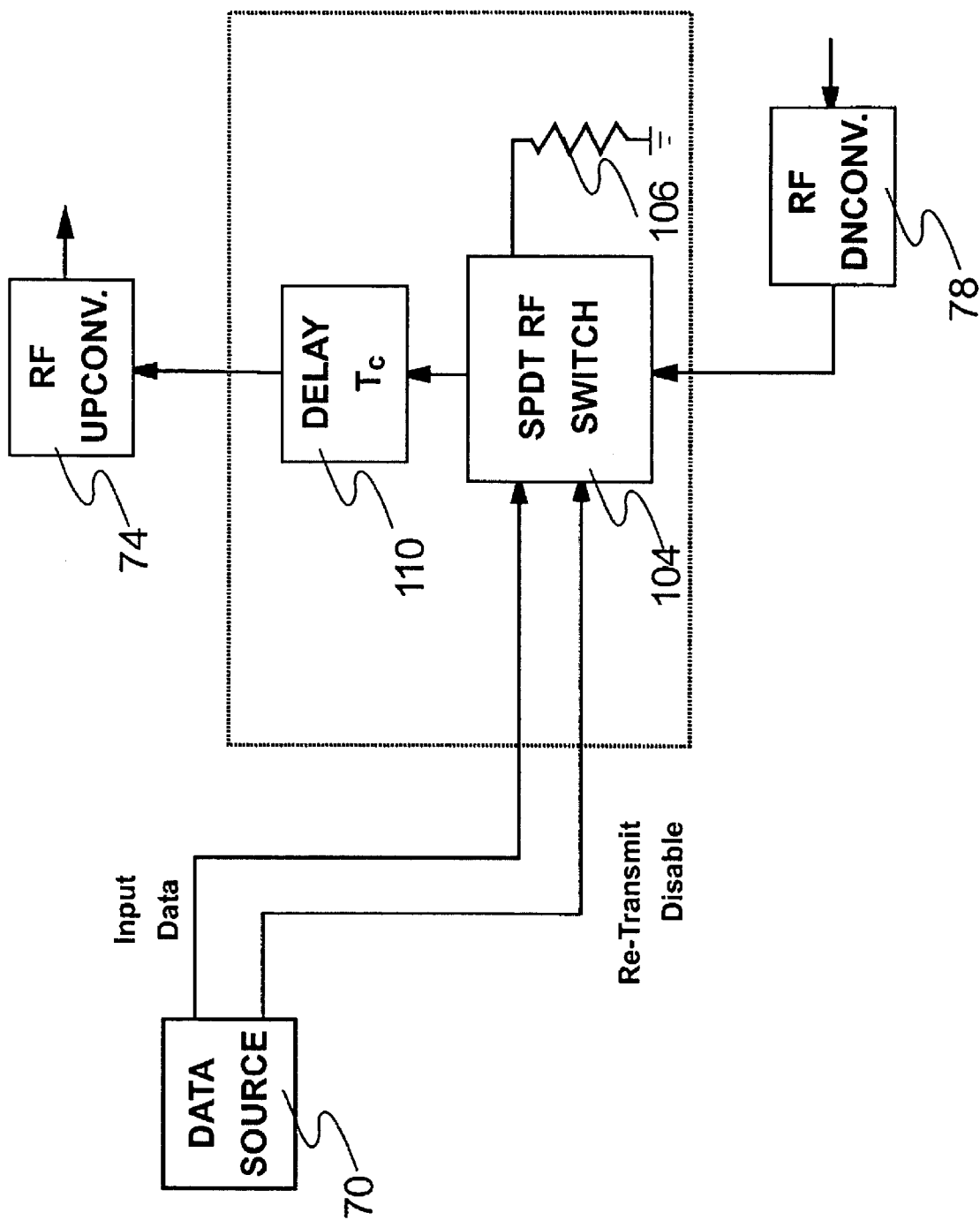
FIG. 6 is a detailed block diagram of a data modulator section of FIGS. 3 and 4, showing an On Off Keying-type embodiment of the data modulator.

FIG. 6 shows a second embodiment of the Terminal data modulator block (76), which utilizes On-Off Keying (OOK) rather than PPM for Terminal Data modulation. As in FIG. 5, The received, downconverted signal is fed from the RF downconvertor 78, to the Terminal data modulator, 76. In this embodiment, the downconverted signal feeds into an SPDT RF switch 104, which transfers the signal either into an RF load 106, or a delay circuit 110, under the control of the two control lines from the Terminal data source 70. When the re-transmit disable line is active, the output of the RF switch 104 is shunted to ground through the RF load, 106. When the re-transmit disable line is inactive, the signal from the RF downconvertor is passed either to the delay circuit 110 (which delays the received signal the transmitted chirp duration $T_C$), or the RF load 106, depending on the state of the input data line. The output of the delay circuit 110, is then passed to the RF upconvertor 74, for retransmission over the channel.

Figure 7:
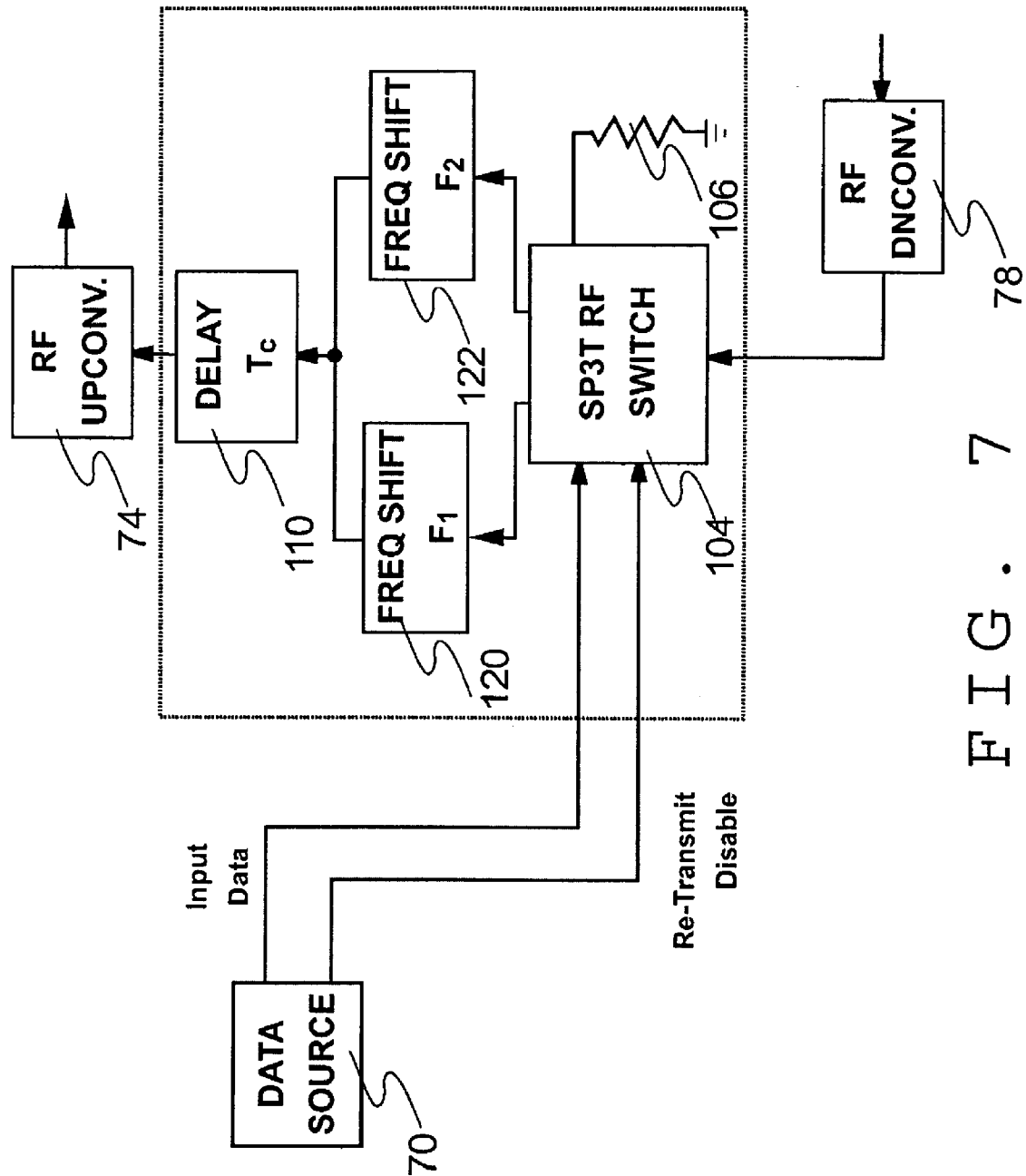
FIG. 7 is a detailed block diagram of a data modulator section of FIGS. 3 and 4, showing a Frequency Shift Keying-type embodiment of the data modulator.

FIG. 7 represents yet another embodiment of the Terminal data modulator block (76) in which Frequency Shift Keying (FSK) has been used as the modulation technique. As in FIG. 5, The received, downconverted signal is fed from the RF downconvertor 78, to the Terminal data modulator, 76. Similarly to FIG. 5, a single-poll three position RF switch 104, allows the signal from the RF downconvertor to be passed to one of two outputs, or shunted to ground, under control of the data source, 70. The two outputs are passed through circuits which shift the frequency of the received signal by either some frequency $F_1$, 120, or some other frequency $F_2$, 122. The output of these two blocks is summed and fed to a delay circuit 110 (which delays the signal a duration equal to the chirp signal duration, $T_C$, and into the RF unconvertor 74, for transmission over the channel. A further embodiment of the circuit shown in FIG. 7 may substitute the frequency shift circuits 120, 122 for phase shift circuits.

Figure 8:
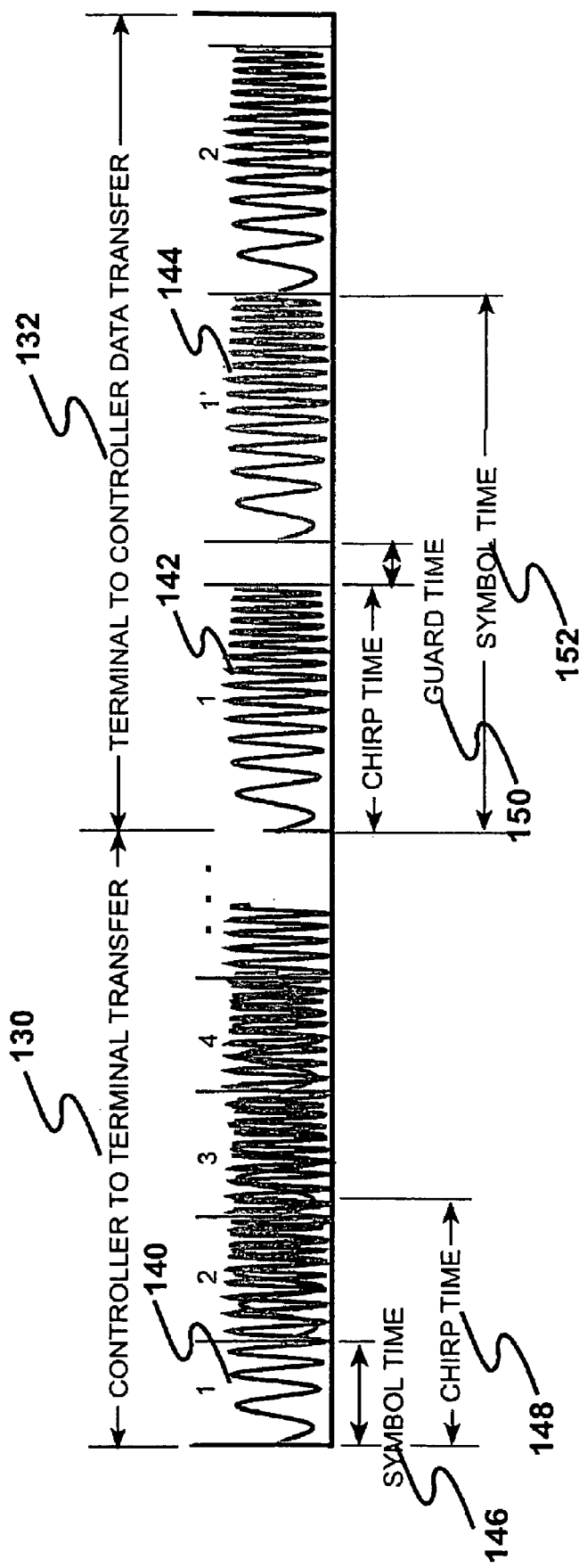
FIG. 8 details signal exchanges (protocol) which may be used to transfer data from the Controller to the Terminal and vice versa, where signals seen at the input to the Controller (both produced, and received by the Controller) are shown in the drawing, and in which signals produced by the Controller are shown shaded as dark, and those received by the Controller (from the Terminal) are shown shaded slightly lighter.

FIG. 8 is a signal diagram highlighting one of the ways in which the Controller can communicate with the Terminal, as well showing the transfer of "carrier" chirp signals which the Terminal uses for communication with the Controller. Two transfer sequences are shown in FIG. 8: a Controller-to-Terminal data transfer 130, and a Terminal-to-Controller data transfer 132. All the signals shown in this diagram would be seen at the output of the Controller antenna, 20. The Controller transfers data to the Terminal by sending chirp signals having some chirp duration, $T_C$, 148, and start times which are separated some separation in time corresponding to the data symbol time, 140. The signals shown have a data symbol time which is shorter than the chirp duration, and this results in overlapping transmitted signals. Imparted on each of these signals is modulation information which the Terminal can demodulate to recover the transmitted data. This modulation information may be in the form of a phase which is a function of the transmitted data (as in FIG. 1, called Direct Modulation) or a chirp sweep rate which is also a function of the data (as in FIG. 2, called Binary Orthogonal Keying). The transmission of data symbols from the Controller to the Terminal will continue for some prescribed number of symbols, which takes up the entire Controller-to-Terminal data transfer period.

When data is to be transmitted from Terminal to Controller 132, the Controller must first transmit a "carrier" chirp signal to the Terminal 142. After this signal has been sent, the Controller will remain quiescent, waiting for re-transmission of the "carrier" chirp signal from the Terminal 144. There will be a short time period during which the Terminal is processing the "carrier" chirp signal sent by the Controller; this is shown as the guard time 150. In the PPM Terminal modulation scheme (FIG. 5) it is the length of this time period the Controller uses to determine which data symbols have been sent. After the Controller has received the re-transmitted "carrier" chirp signal from the Terminal 144 (this signal now having the Terminal's modulation information imparted upon it), the "carrier" chirp signal for the next symbol may be transmitted by the Controller. Thus the Terminal-to-Controller symbol time 152, consists of the Controller "carrier: chirp signal transmit time 142, plus the guard time 150, plus the Terminal signal retransmit time 144. This shows how the Terminal-to-Controller data transfer rate will be smaller than the Controller-to-Termina data transfer rate.

Thus, there has been described a wireless communication system that in one embodiment uses a broadband chirp signal rather than a narrowband RF pulse. The nature of the chirp signal provides processing gain which allows for a reduction in the necessary transmitted power. The wireless communication system provides data flowing freely through both sides of the link, while providing a low power transceiver architecture.

The star-like topology of Controller-Terminal networks is therefore exploited in order to shift hardware complexity from the Terminal side to the Controller side. The Terminals are not allowed to communicate directly with each other (they can communicate indirectly through the Controller), allowing the Terminals to have reduced functionality; specifically, the inability to generate any of their own RF signals. This responsibility for signal generation and system synchronization is placed completely on the Controller. Hence, the wireless communication system described here eliminates most or all of the RF signal generating hardware in the Terminal (i.e. oscillators, power amplifiers, etc.).

In the claims, the word "comprising" is used in its inclusive sense and does not exclude other elements being present. The indefinite article "a" before a claim feature does not exclude more than one of the feature being present. Immaterial modifications may be made to the embodiments described here without departing from what is covered by the claims.

REFERENCES

[1] Viterbi, Andrew J.: 'CDMA, Principles of Spread Spectrum Communication, (Addison-Wesley, Reading, Mass., 1995).
[2] Peterson, Roger, Zeimer, Rodger, and Borth, David: 'Introduction to Spread Spectrum Connunications', (Prentice-Hall, Englewood Cliffs, N.J., 1995).
[3] Pinkney, J., Behin, R., Sesay, S., and Nichols, S.: 'A High-Speed DQPSK Chirp Spread Spectrum System for Indoor Wireless Applications', *Electronics Letters*, October 1998, 34, (20), pp. 1910-1911.
[4] Cooke, C.: 'Pulse Compression: The Key to more efficient RADAR transmission', *Proceedings of the IRE*, vol. 48, pp. 310-316, March 1960.
[5] Winkler, M.: 'Chirp Signals for Communications', *Wescon Convention Record*, vol. Pt. 7, 1962.
[6] Gott, G. F and Newsome, J. P.: 'H.F. Data Transmission Using Chirp Signals', *Proc. IEE*, September 1971, 118, (9), pp. 1162-1166.
[7] Forgan, H.: 'A Study of Digital Radio Links Using Chirp signals', Ph.D. Thesis, University of Nottingham, 1971.
[8] Berni, H. and Gregg, W.: 'On the Utility of using Chirp Modulation for Digital Signaling', *IEEE Trans. on Communications*, vol. COMM-21, no. 6, pp. 748-751, 1973.
[9] Pinkney, J., Behin, R., Sesay, S., and Nichols, S.: 'A High-Speed DQPSK Chirp Spread Spectrum System for Indoor Wireless Applications', *Electronics Letters*, October 1998, 34, (20), pp. 1910-1911
[10] Huemer, M., Pohl, A., Gugler, W., Springer, A., Weigel, R., and Seifert, F.: 'Design and verification of a SAW-based chirp spread spectrum system', *Proceedings of the IEEE MTT-S International Microwave Symposium*, vol. 1, pp. 189-192, Jun. 7-12 1998, Baltimore.
[11] Proakis, J. G.: 'Digital Communications', (McGraw-Hill, New York, 1995).
[12] Campbell, C.: 'Surface Acoustic Wave Devices and Their Signal Processing Applications', (Academic Press, Boston, 1989).

What is claimed is:

1. A wireless transceiver, comprising:
an antenna for receiving spread spectrum chirp signals;
a re-transmitter connected to the antenna, the re-transmitter incorporating a modulator; and
a data processor including a data sink and a data source, the data sink being connected to receive spread spectrum chirp signals from the antenna and the data source being connected to the modulator to provide modulation of data onto spread spectrum chirp signals received at the antenna, for re-transmission of the signals received at the antenna and modulated by the modulator.

2. The wireless transceiver of claim 1 in which the data processor incorporates a dispersive filter between the antenna and the data sink.

3. The wireless transceiver of claim 2 in which the data processor incorporates a demodulator between the dispersive filter and the data sink.

4. The wireless transceiver of claim 1 in which the re-transmitter incorporates a delay module between the modulator and the antenna.

5. The wireless transceiver of claim 1 in which the re-transmitter incorporates a re-transmit disable switch connected to receive a control signal from the data source.

6. A method of wireless communication between transceivers in which the transceivers include at least a controller and a terminal, the method comprising the steps of:
the controller transmitting signals to the terminal according to a protocol;
the terminal processing the signals in a re-transmit mode and a data processing mode;
in which, in the re-transmit mode, the terminal modulates and re-transmits signals received from the controller; and
in the data processing mode, the terminal demodulates signals received from the controller.

7. The method of claim 6 in which, according to the protocol, the controller sends unmodulated signals to the terminal for re-transmission.

8. The method of claim 6 in which the signals transmitted by the controller are spread spectrum signals.

9. The method of claim 8 in which the signals transmitted by the controller are chirp spread spectrum signals, and the chirp spread spectrum signals each have a chirp time.

10. The method of claim 9 in which the terminal delays retransmission of chirp spread spectrum signals by at least the chirp time.

11. The method of claim 6 in which the terminal modulates the signal for re-transmission by time delay modulation.

12. The method of claim 6 in which the terminal modulates the signal for re-transmission by on-off keying.

13. The method of claim 6 in which the terminal modulates the signal for re-transmission by frequency shift keying.

14. A non-transitory computer readable medium having a computer program stored thereon, wherein the computer program is configured to cause a transceiver to implement a method according to claim 6.

15. Apparatus for a wireless transceiver for communicating chirp signals, the apparatus comprising:
a re-transmitter configured to receive chirp signals from an antenna, the re-transmitter comprising a modulator; and
a data sink in communication with the modulator;
wherein the modulator is configured to provide modulation of data from the data sink onto received chirp signals for re-transmitting using an antenna.

16. Apparatus according to claim 15, wherein the modulator is configured to modulate a received chirp signal so as to provide at least one of: Pulsed Position Modulation; On Off Keying; and Frequency Shift Keying.

17. A method for wirelessly communicating signals, the method comprising:

receiving a signal having been received using an antenna;

determining whether the received signal should be processed in a data processing mode or a re-transmit mode; and storing data from the received signal in a data sink when in a determined data processing mode, and using a modulator to modulate the received signal with data from a data store in re-transmit mode for re-transmission.

18. A non-transitory computer readable medium having a computer program stored thereon, wherein the computer program is configured to cause a wireless communication apparatus to implement a method according to claim 17.

* * * * *